United States Patent [19]

Carpenter

[11] 4,357,905
[45] Nov. 9, 1982

[54] MOATED PET FEEDER

[75] Inventor: Robert W. Carpenter, Enon, Ohio

[73] Assignee: Louis E. Hay, Dayton, Ohio ; a part interest

[21] Appl. No.: 301,558

[22] Filed: Sep. 14, 1981

[51] Int. Cl.³ .................................................. A01K 5/00
[52] U.S. Cl. ..................................... 119/61; 119/51.5
[58] Field of Search ................. 119/51.5, 61; D30/16

[56] References Cited

U.S. PATENT DOCUMENTS

| | | | |
|---|---|---|---|
| D. 258,018 | 1/1981 | Venditto et al. ................... | 119/51.5 |
| 1,351,285 | 8/1920 | Chess ..................................... | 119/61 |
| 2,191,811 | 2/1940 | Trampier ............................ | 119/51.5 |
| 2,583,218 | 1/1952 | Lambeth ............................ | 119/51.5 |
| 2,584,301 | 2/1952 | Sinclair ............................... | 119/51.5 |
| 2,677,350 | 5/1954 | Prestidge et al. ..................... | 119/61 |
| 4,007,711 | 2/1977 | Michael ............................... | 119/51.5 |

*Primary Examiner*—Gene Mancene
*Assistant Examiner*—John J. Wilson
*Attorney, Agent, or Firm*—Louis E. Hay

[57] ABSTRACT

A moated pet feeder of the type which combines a food bowl and a water bowl; the food bowl being surrounded by a moat cavity which fills with water flowing through a substantially horizontal passage connecting the moat cavity with the water bowl to thereby form a moat which ants and other crawling insects will not cross to gain access to the food in the food bowl.

4 Claims, 4 Drawing Figures

U.S. Patent  Nov. 9, 1982  4,357,905
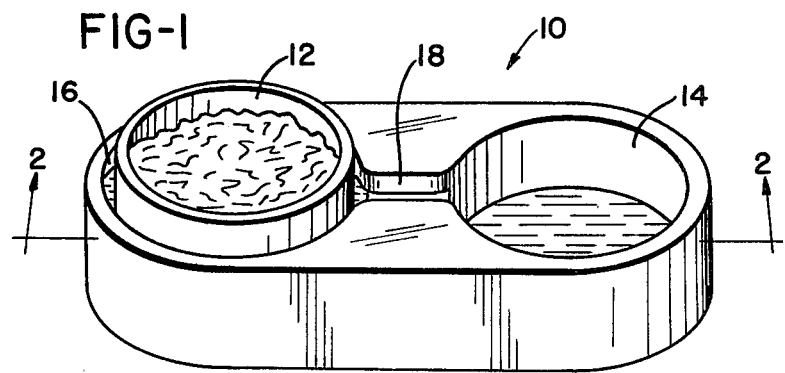
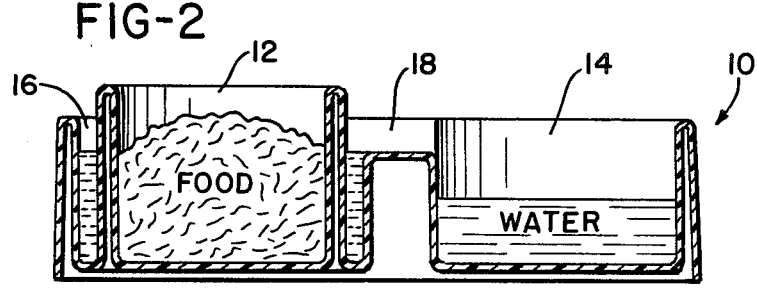
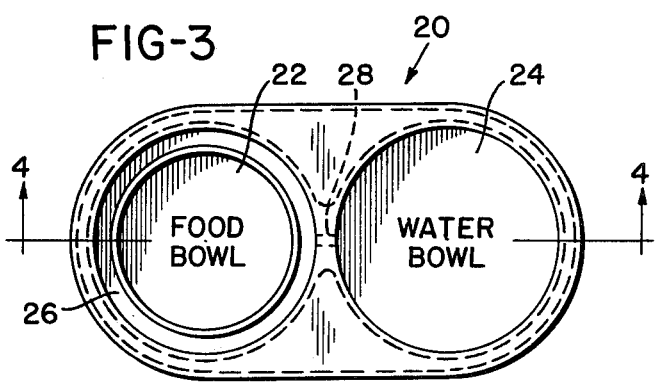
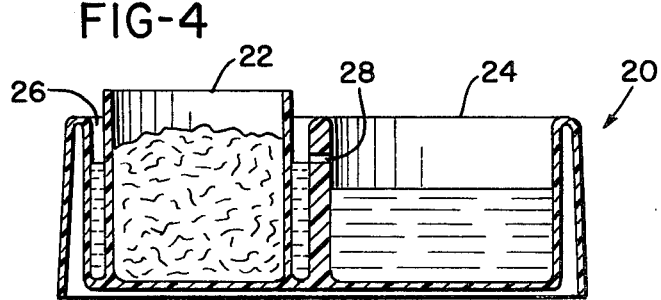

MOATED PET FEEDER

BACKGROUND OF THE INVENTION

Pet feeders, of the type related to the present invention, in nearly all cases are used for the indoor feeding of small pets such as dogs and cats. The feeders are nearly always placed on the floor adjacent to an external wall where they are especially accessable to crawling insects, such as ants, which have a propensity for seeking a supply of food. These insects will not only contaminate the pet food, but also cannot be tolerated in human habitates.

Numerous attempts have been made to design a pet feeder which will resolve the problem of crawling insects. Most of the past effect has produced feeders which have a multiplicity of discrete components which must be disassembled for cleaning and then reassembled before further use. Such feeders are also relatively expensive to manufacture, and thus require a retail price which is higher than purchasers are willing to pay. Another disadvantage of such feeders is that the element forming the moat must be independently filled from filling the water bowl of the feeder. Two examples of such feeders are U.S. Pat. Nos. 2,584,301 Sinclair; and 4,007,711 Michael.

The best known prior art patent to which the present invention relates is U.S. Pat. No. 2,191,811 Trampier. This is the only patent known to the inventor in which a trough forming the moat is filled from the water bowl in the feeder. Unlike applicant's feeder, which will be fully described below, the Trampier feeder can overflow the moat without overflowing the water bowl. The Trampier feeder was stated to be preferably formed of pottery, and, because of its configuration, it is not adaptable to be formed by the injection molding process which is very much cheaper, but was not in common use at the time the Trampier patent application was filed in 1939.

SUMMARY OF THE INVENTION

The pet feeder, constituting the present invention, has the general appearance of a conventional feeder with the principal exception of having a moat-forming cavity surrounding the food bowl, the cavity being filled through a substantially horizontal passage connecting the cavity to the water bowl. Because of its specific design, the moat cannot overflow without also overflowing the water bowl. The present feeder may be injection molded in a single piece, and without requiring subsequent machining operations.

BRIEF DESCRIPTION OF THE DRAWINGS

FIG. 1 is a perspective view of a first species of the feeder, and showing the moat cavity surrounding the food bowl connected to the water bowl by means of an open channel passage;

FIG. 2 is a vertical section taken along line 2—2 of FIG. 1; FIG. 3 is a plan view of a second species of the feeder; and, FIG. 4 is a vertical section taken along line 4—4 of FIG. 3.

DESCRIPTION OF THE PREFERRED EMBODIMENT

Specific reference is made to FIGS. 1 and 2 which depict the first species of the feeder. The feeder 10 is a unitary structure having a food bowl 12 and a water bowl 14. The food bowl 12 is surrounded by a moat cavity 16 which is connected to the water bowl 14 by a passage 18 in the form of an open channel. As best depicted in FIG. 2, the bottom of the open channel is at such elevation as will establish the minimum depth of the water forming the moat in moat cavity 16. The pet may drink all the water in the water bowl without further lowering the water level in cavity 16.

As depicted, the top edges of the water bowl 14 and moat cavity 16 are substantially on the same horizontal plane. This prevents the overflow of water in the cavity unless the bowl is overfilled. The upper rim of the food bowl extends above the plane of the cavity and water bowl in order to exclude entry of water into the food bowl.

Specific reference is now made to FIGS. 3 and 4 which depict a second species of the feeder. The feeder 20 is a unitary structure having a food bowl 22 and a water bowl 24. The food bowl 22 is surrounded by a moat cavity 26 which is connected to the water bowl 24 by a passage 28 in the form of an aperture. As best depicted in FIG. 4, the bottom of the passage or aperture is at such elevation as will establish the minimum depth of the water forming the moat in moat cavity 26. The pet may drink all the water in the water bowl without further lowering the water level in cavity 26.

As depicted, the top edges of the water bowl 24 and moat cavity 26 are substantially on the same horizontal plane. This prevents the overflow of water in the cavity unless the bowl is overfilled. The upper rim of the food bowl extends above the plane of the cavity and water bowl in order to exclude entry of water into the food bowl.

Both depicted species may be easily and economically formed of plastic material by the injection molding process. The food and water bowls may be contiguous as depicted in FIGS. 3 and 4; or, they may be separated to any convenient distance as depicted in FIGS. 1 and 2.

The aperture 28, as depicted in FIG. 4, may be of any cross-section, and may be formed during the molding operation. It can also be formed after molding by using an angle drilling machine. Another method would be to support the molded feeder at an angle sufficient for drill clearance, and to then drill the aperture at an angle. An open channel may also be used when the two bowls are contiguous as depicted in FIGS. 3 and 4.

It is to be understood that the embodiments of the present invention as shown and described are to be regarded as merely illustrative, and that the invention is susceptible to variations, modifications and changes, without regard to specific construction methods, within the scope of the appended claims.

I claim:

1. A moated pet feeder comprising: a unitary structure having a food bowl, a water bowl, a moat cavity surrounding said food bowl with the upper edges of said moat cavity and the upper edges of said water bowl on a substantially common horizontal plane, and a substantially horizontal flow passage connecting said moat cavity to said water bowl for flowing water from said water bowl into said moat cavity to form a moat around said food bowl.

2. A moated pet feeder comprising: a unitary structure having a food bowl, a water bowl, a moat cavity surrounding said food bowl with the upper edges of said moat cavity and the upper edges of said water bowl being on a substantially common horizontal plane, and a substantially horizontal flow passage connecting said moat cavity to said water bowl with the bottom of said flow passage being vertically located to be above the bottom of said moat cavity to establish the minimum depth of water in said moat cavity.

3. A moated pet feeder in accordance with claim 2 in which said flow passage is an aperture.

4. A moated pet feeder in accordance with claim 2 in which said flow passage is a channel open at the top.

* * * * *